United States Patent
Scherenberg

[11] 3,820,522
[45] June 28, 1974

[54] VALVE SEAT FOR THE INLET VALVE IN THE CYLINDER HEAD OF A FOUR-CYCLE INTERNAL COMBUSTION ENGINE

[75] Inventor: Hans O. Scherenberg, Stuttgart-Heumaden, Germany

[73] Assignee: Daimler-Benz Aktiengesellschaft, Stuttgart-Unterturkheim, Germany

[22] Filed: Jan. 23, 1970

[21] Appl. No.: 5,183

[30] Foreign Application Priority Data
Jan. 24, 1969   Germany.......................... 1903436

[52] U.S. Cl........ 123/188 S, 123/188 M, 123/141 R
[51] Int. Cl........................... F01l 3/00, F02m 29/00
[58] Field of Search............ 123/188 S, 191, 188 M, 123/141

[56] References Cited
UNITED STATES PATENTS

| | | | |
|---|---|---|---|
| 408,460 | 8/1889 | Capitaine............................. | 123/30 |
| 1,340,062 | 5/1920 | Laphan................................ | 123/30 |
| 1,512,952 | 10/1924 | Secor.................................. | 123/30 |
| 1,526,963 | 2/1925 | Chandler........................ | 123/188 M |
| 1,969,202 | 8/1934 | Bugaud.............................. | 123/30 |
| 2,174,337 | 9/1937 | Weismiller..................... | 123/188 M |
| 2,248,988 | 7/1941 | Hanson................................ | 123/30 |
| 3,693,606 | 9/1972 | Hardenberg....................... | 123/141 |

FOREIGN PATENTS OR APPLICATIONS

| | | | |
|---|---|---|---|
| 3,927 | 6/1900 | Great Britain........................ | 123/32 |
| 150,001 | 8/1920 | Great Britain........................ | 123/32 |
| 581,051 | 1/1924 | France.................................. | 123/32 |

*Primary Examiner*—Laurence M. Goodridge
*Assistant Examiner*—Ronald B. Cox
*Attorney, Agent, or Firm*—Craig & Antonelli

[57] ABSTRACT

A valve seat for the inlet valve in the cylinder head of a four-cycle internal combustion engine in which the valve seat is provided with a sharp edge projecting into the combustion space in the axial direction of the inlet valve as a detaching step surrounding the valve disk of the inlet valve for any fuel components precipitated along the walls of the inlet channel.

22 Claims, 1 Drawing Figure

PATENTED JUN 28 1974
3,820,522
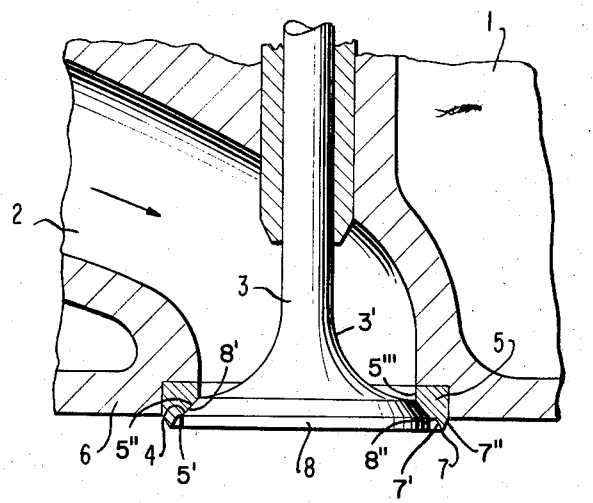
INVENTOR
HANS O. SCHERENBERG
BY
Craig, Antonelli, Stewart & Hill
ATTORNEYS

VALVE SEAT FOR THE INLET VALVE IN THE CYLINDER HEAD OF A FOUR-CYCLE INTERNAL COMBUSTION ENGINE

The present invention relates to the valve seat for the inlet valve in the cylinder head of a four-cycle internal combustion engine.

Especially with cold four-cycle internal combustion engines, fuel precipitates at the walls of the inlet channel and at the walls of the valve chamber. The precipitated fuel is not detached from the walls by the combustion air flowing past the same but instead creeps along the walls up to the valve seat, from where considerable quantities continue to creep along or leak to the cylinder head walls. Since the fuel at the cylinder head wall partakes only incompletely or not at all in the combustion, the mixture preparation is influenced in an unfavorable manner in the sense that larger quantities of poisonous components can be traced in the exhaust gas.

The present invention, for the purpose of the improvement of the mixture preparation, of the combustion and therewith of the exhaust gas composition, aims at taking measures so that fuel precipitated at the walls in the inlet channel and in the valve chamber cannot reach the cylinder head walls. The underlying problems are solved in accordance with the present invention in that the valve seat is provided with a sharp edge projecting in the axial direction of the inlet valve into the combustion space as detaching step for the precipitated fuel components surrounding the seat of the inlet valve. By the provision of the sharp edge at the valve seat it is achieved with small expenditures that the precipitated fuel that has crept up to the valve seat, is torn off and thus detached from the sharp edge by the combustion air flowing past the same with highest velocity and is thrust together with the combustion air into the cylinder or at least against the hot disk of the inlet valve. The precipitated fuel thus reaches combustion in a manner favorable for the mixture preparation either air-distributed or evaporated. The exhaust gases exhibit fewer poisonous components.

In an advantageous type of construction of the present invention, the sharp edge may project about 0.5 to 1 mm. out of the plane of the valve seat.

Insofar as a valve seat ring is provided for the inlet valve, the sharp edge may be arranged at the valve seat ring.

Accordingly, it is an object of the present invention to provide a valve seat for the inlet valve in the cylinder head of a four-cycle internal combustion engine which avoids by simple means the aforementioned shortcomings and drawbacks encountered in the prior art.

Another object of the present invention resides in a valve seat for the inlet valve of a four-cycle internal combustion engine which effectively precludes any fuel precipitated along the walls of the inlet channel from reaching the cylinder head walls.

A further object of the present invention resides in a valve seat for the inlet valve in the cylinder head of a four-cycle internal combustion engine which contributes to the mixture preparation while minimizing the poisonous components in the exhaust gases.

Still a further object of the present invention resides in a four-cycle internal combustion engine provided with a valve seat for the inlet valve which effectively contributes to a reduction of harmful components in the exhaust gases.

Another object of the present invention resides in a four-cycle internal combustion engine provided with a valve seat for the inlet valve in the cylinder head which improves the mixture preparation, the combustion processes and therewith the exhaust gas compositions.

These and further objects, features and advantages of the present invention will become more obvious from the following description when taken in connection with the accompanying drawing which shows, for purposes of illustration only, one embodiment in accordance with the present invention, and wherein:

The single FIGURE is a partial cross-sectional view through the cylinder head of four-cycle internal combustion engine in accordance with the present invention illustrating the valve seat for the inlet valve thereof.

Referring now to the single FIGURE of the drawing, reference numeral 1 designates the cylinder head of an otherwise conventional four-cycle internal combustion engine of any known construction. The inlet valve 3 is provided in the cylinder head 1 for the control of the inlet channel 2. The seat 4 of the inlet valve 3 is constituted by the valve seat ring 5 inserted into the cylinder head 1. In order to avoid that with a cold internal combustion engine, fuel precipitated at the walls of the inlet channel and at the walls of the valve chamber creeps along the valve 4 up to the walls 6 of the cylinder head 1 closing off the combustion space, the sharp edge 7 projecting into the combustion space in the axial direction of the inlet valve 3 is provided at the valve seat ring 5 which serves as fuel detaching step surrounding the valve disk 8 of the inlet valve 3.

The maximum diameter of the valve disc 8 is thereby smaller than the diametric dimension of the tip of the sharp edge 7. The sharp edge 7 is formed by two substantially conical surface portions 7' and 7" provided at the valve seat ring 5 which includes a small surface portion 5' extending at right angle to the valve stem axis, which connects the surface portion 7' with the valve seat sealing surface portion 5" that is complementary to the sealing surface portion 8' of the inlet valve. The sealing surface portion 8' is adjoined by a circumferential surface portion 8" extending generally in the axial direction of the valve stem 3 so that the tip of the sharp edge 7 is radially spaced from the valve disc 8 when the latter is in the fully closed condition as shown in the drawing. The valve seat ring 5 is also provided with an upper surface portion 5''', passing over smoothly into the walls of the inlet channel 2 by being substantially parallel thereto so that an angle is formed between this wall portion 5''' and the flaring walls 3' connecting the valve stem 3 with the valve disc.

The combustion air flowing past the sharp edge 7 with high velocity tears off from the sharp edge 7 any fuel that has crept along the walls up to the sharp edge and takes along the fuel air-distributed into the combustion space or throws the same against the disk of the inlet valve from where it evaporates and thus reaches the cylinder in vapor form.

While I have shown and described only one embodiment in accordance with the present invention, it is understood that the same is not limited thereto but is susceptible of numerous changes and modifications as known to those skilled in the art and I therefore do not wish to be limited to the details shown and described herein, but intend to cover all such changes and modifications as are within the scope of those skilled in the art.

What is claimed:

1. A valve seat for a suspended inlet valve in the cylinder head of a four-cycle internal combustion engine in which the axis of the valve stem is disposed generally in the vertical direction and the valve disc is arranged at the lower end of the valve stem, characterized in that the valve seat is provided with a sharp pointed annular edge about the entire circumference of the valve seat, said annular edge projecting only slightly into the combustion space substantially in the axial direction of the inlet valve as detaching step for precipitated fuel components flowing along the walls of the inlet channel so that the combustion air flowing with high velocity past the sharp annular edge tears off from said sharp edge any fuel that has crept along the walls of the sharp edge and takes along the fuel air distributed into the combustion space or throws the same against the disc of the inlet valve from where it evaporates and thus reaches the cylinder in vapor form, said sharp edge being disposed radially outwardly of the valve disc and projecting freely into the combustion space when the valve disc is in the closed condition, and characterized in that the sharp edge is formed by two annular converging surface portions, with the outer converging surface portion forming an angle substantially greater than 90° with the adjoining wall portion of the cylinder head adjoining the same outwardly thereof and defining at least in part the upper wall of the combustion space, and with the angle formed by said annular converging surface portions being substantially less than 90°.

2. A valve seat according to claim 1, characterized in that the sharp edge projects by about 0.5 to 1 mm. out of the plane of the valve seat.

3. A valve seat according to claim 2, with a valve seat ring inserted into the cylinder head, characterized in that the sharp edge is arranged at the valve seat ring.

4. A valve seat according to claim 1, with a valve seat ring inserted into the cylinder head, characterized in that the sharp edge is arranged at the valve seat ring.

5. A four-cycle internal combustion engine of the overhead-type with a cylinder head having an inlet channel valved by an overhead inlet valve normally seated against a valve seat and having a valve disc at the lower end of a valve stem, characterized in that means are provided to prevent fuel precipitated along the walls of the inlet channel from reaching the cylinder head walls, defining at least in part the upper portion a combustion chamber, by flowing past the valve seat ring having a conical seating surface with the cone apex disposed above the valve disc in the valve axis, including detaching means formed by a circumferentially disposed sharp edge projecting from the valve seat only slightly into the combustion space and pointing downwardly substantially in the axial direction of the inlet valve so that the combustion air flowing with high velocity past the sharp annular edge tears off from said sharp edge any fuel that has crept along the walls of the sharp edge and takes along the fuel air distributed into the combustion space or throws the same against the disc of the inlet valve from where it evaporates and thus reaches the cylinder in vapor form, said sharp edge being uncovered by said valve disc and projecting freely into the combustion space in all operating positions of the valve disc with the lowest point of said sharp edge projecting into the combustion space a distance at most equal to any operating position of the bottom surface of the valve disc, and characterized in that the sharp edge is formed by two annular converging surface portions, with the outer converging surface portion forming an angle substantially greater than 90° with the adjoining wall portion of the cylinder head adjoining the same outwardly thereof and defining at least in part the upper wall of the combustion space, and with the angle formed by said annular converging surface portions being substantially less than 90°.

6. An internal combustion engine according to claim 5, characterized in that the edge projects out of the plane of the plane of the valve seat by about 0.5 to 1 mm.

7. An internal combustion engine according to claim 5, characterized in that said means forms part of a valve seat ring in the cylinder head.

8. A valve seat for an inlet valve of an inlet chamber in the cylinder head of a four-cycle internal combustion engine of the overhead valve-type, in which the longitudinal axis of the valve stem of the inlet valve is disposed generally in the vertical direction and the valve disc is provided at the lower end of the valve stem, and in which conical sealing surface means are formed between complementary sealing surfaces at the valve seat and at the valve disc, the apex of the cone of said sealing surface means being arranged substantially in the longitudinal axis of the valve stem above the valve disc, characterized in that the valve seat is provided with a fuel detaching means in the form of a sharp edge projecting only a small distance downwardly into the combustion space substantially in the axial direction of the inlet valve as detaching step for precipitated fuel components precipitated and flowing along the walls of the inlet channel so that the combustion air flowing with high velocity past the sharp annular edge tears off from said sharp edge any fuel that has crept along the walls of the sharp edge and takes along the fuel air distributed into the combustion space or throws the same against the disc of the inlet valve from where it evaporates and thus reaches the cylinder in vapor form, the maximum diameter of the valve disc being smaller than the diameter of the tip of the sharp edge, and the lowest point of said sharp edge being generally within the area of the bottom surface of said valve disc, and characterized in that the sharp edge is formed by two annular converging surface portions, with the outer converging surface portion forming an angle substantially greater than 90° with the adjoining wall portion of the cylinder head adjoining the same outwardly thereof and defining at least in part the upper wall of the combustion space, and with the angle formed by said annular converging surface portions being substantially less than 90°.

9. A valve seat according to claim 8, characterized in that said sharp edge extends about the entire circumference of the valve seat.

10. A valve seat according to claim 9, characterized in that the sealing surface means are exclusively rectilinear surfaces of portions of the generatrices of the cone.

11. A valve seat according to claim 10, characterized in that the valve seat and valve disc are provided with surface portions above and below the sealing surface portions of such shape that in the closed condition of the inlet valve, intersecting surfaces of a respective valve seat surface portion and valve disc surface portion define each an angle above and below the sealing surface means.

12. A valve seat according to claim 11, characterized in that the valve seat surface portion above the sealing surface means is substantially parallel to the adjacent surface portion of the inlet wall.

13. A valve seat according to claim 12, characterized in that said sharp edge projects into the combustion space from a plane containing the wall portion of the cylinder head adjoining the valve seat radially outwardly of the annular sharp edge.

14. A valve seat according to claim 13, characterized in that the sharp edge is arranged on the valve seat.

15. A valve seat according to claim 14, characterized in that the sharp edge projects by about 0.5 to 1 mm out of the bottom plane of the valve seat.

16. A valve seat according to claim 8, characterized in that the valve seat and valve disc are provided with surface portions above and below the sealing surface portions of such shape that in the closed condition of the inlet valve, intersecting surfaces of a respective valve seat surface portion and valve disc surface portion define each an angle above and below the sealing surface means.

17. A valve seat according to claim 8, characterized in that the valve seat surface portion above the sealing surface means is substantially parallel to the adjacent surface portion of the inlet wall.

18. A valve seat according to claim 8, characterized in that said sharp edge projects into the combustion space from a plane containing the wall portion of the cylinder head adjoining the valve seat radially outwardly of the annular sharp edge.

19. A valve seat according to claim 8, characterized in that the sharp edge is arranged on the valve seat.

20. A valve seat according to claim 8, characterized in that the sharp edge projects by about 0.5 to 1 mm out of the bottom plane of the valve seat.

21. A valve seat according to claim 1, characterized in that the lowest point of said sharp annular edge is at a height corresponding generally to the order of the height of the lower surface of the valve disc and is generally unobstructed by any part of the valve disc.

22. A valve seat according to claim 21, characterized in that the lowest point of said sharp edge is located generally in the plane of the bottom surface of the valve disc when the latter is in its closed position.

* * * * *